US010287036B2

(12) United States Patent
Lichtin et al.

(10) Patent No.: US 10,287,036 B2
(45) Date of Patent: May 14, 2019

(54) ARCJET PROPULSION SYSTEMS FOR SPACECRAFT

(71) Applicant: Lockheed Martin Corporation, Bethesda, MD (US)

(72) Inventors: Daniel Albert Lichtin, Highlands Ranch, CO (US); Jacob H. Blum, Lansdale, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 394 days.

(21) Appl. No.: 15/206,181

(22) Filed: Jul. 8, 2016

(65) Prior Publication Data

US 2018/0010586 A1   Jan. 11, 2018

(51) Int. Cl.
*B64G 1/40* (2006.01)
*B64G 1/26* (2006.01)
*B64G 1/42* (2006.01)

(52) U.S. Cl.
CPC ............ *B64G 1/406* (2013.01); *B64G 1/26* (2013.01); *B64G 1/42* (2013.01)

(58) Field of Classification Search
CPC .......... B64G 1/406; F03H 1/00; F03H 1/0081
See application file for complete search history.

(56) References Cited

U.S. PATENT DOCUMENTS

| | | | | |
|---|---|---|---|---|
| 4,766,724 A * | 8/1988 | Gruber | ............... | F03H 1/00 219/383 |
| 4,800,716 A * | 1/1989 | Smith | ............... | B64G 1/406 219/121.57 |
| 5,513,087 A * | 4/1996 | Kay | ............... | F03H 1/00 219/121.57 |
| 5,819,526 A * | 10/1998 | Jackson | ............... | B64G 1/402 219/121.51 |
| 6,295,804 B1 * | 10/2001 | Burton | ............... | F03H 1/00 60/202 |
| 6,543,723 B1 * | 4/2003 | Oh | ............... | B64G 1/007 244/158.5 |
| 8,613,188 B2 * | 12/2013 | Stein | ............... | F03H 1/0093 60/203.1 |
| 9,242,747 B1 * | 1/2016 | Burton | ............... | B64G 1/405 |

(Continued)

OTHER PUBLICATIONS

L. Wallner, et al., "Arc-Jet Thruster for Space Propulsion", National Aeronautics and Space Administration—NASA Technical Note, Jun. 1965, pp. 1-69, NASA TN D-2868, National Aeronautics and Space Administration, Washington, D.C., U.S.

(Continued)

*Primary Examiner* — Joseph W Sanderson
(74) *Attorney, Agent, or Firm* — Morgan, Lewis & Bockius LLP

(57) ABSTRACT

An arcjet thruster system for a spacecraft is provided. The arcjet thruster system may include a power supply that includes a radio-frequency start power supply and a continuous direct-current power supply, each selectively coupled to electrodes of an arcjet for initiation and maintenance of an arc between the electrodes. A radio-frequency/direct-current control module may be provided for selectively coupling the radio-frequency start power supply and a continuous direct-current power supply. The radio-frequency start power supply may be used to initiate an arc that is then sustained by the continuous direct-current power supply.

13 Claims, 8 Drawing Sheets

(56) References Cited

U.S. PATENT DOCUMENTS

2010/0058734 A1\* 3/2010 Stein .................. B64G 1/406
          60/203.1
2012/0318886 A1\* 12/2012 Manzoni ............. B64G 1/406
          239/11

OTHER PUBLICATIONS

"OEM-12B—RF Plasma Generator—1250 Watts /13.56MHz RF Power for Plasma Applications", Jun. 1997, 1 page, ENI, www.enipower.com.
"OEM-6M—RF Plasma Generator", ENI Service Manual, 1996, pp. S-i-S2-16, ENI.
"MN2700 Matching Network Instruction Manual", Drake, 1978, pp. ii-4-3, R. L. Drake Company, Miamisburg, U.S.

\* cited by examiner

ARCJET PROPULSION SYSTEMS FOR SPACECRAFT

STATEMENT REGARDING FEDERALLY SPONSORED RESEARCH OR DEVELOPMENT

Not applicable.

FIELD

The present disclosure generally relates to spacecraft propulsion systems and in particular to, for example, arcjets for spacecraft.

BACKGROUND

Mono-propellant arcjet thrusters are commonly provided as part of spacecraft propulsion systems to provide an efficient use of propellant to give long maneuver lifetimes with less propellant than more conventional mono-propellant and bi-propellant propulsion systems and less risk than other electric propulsion systems. In a typical arcjet thruster, an electrical arc formed by direct current is generated between a cathode and an anode between which propellant gas is flowing. The arc adds additional energy to the propellant and increases the amount of thrust generated.

However, over time and repeated uses, various arcjet components can wear out. This can be particularly problematic for spacecraft since repair is difficult or impossible and malfunction of the arcjet can adversely impacting maneuver life of the satellite itself. It would therefore be desirable to be able to provide longer lasting arcjets for spacecraft and other systems.

The description provided in the background section should not be assumed to be prior art merely because it is mentioned in or associated with the background section. The background section may include information that describes one or more aspects of the subject technology.

SUMMARY

In one or more implementations, an arcjet thruster for a spacecraft includes an arcjet having an anode, a cathode, and a propellant valve configured to direct a propellant between the cathode and the anode; and a power module comprising a radio-frequency start power supply, a direct-current continuous power supply, and a radio-frequency/direct-current control module coupled between the arcjet and the radio-frequency start power supply and the direct-current continuous power supply.

In one or more implementations, a spacecraft is provided that includes: an arcjet thruster, the arcjet thruster having: an arcjet having an anode, a cathode, and a propellant valve configured to direct a propellant between the cathode and the anode; a direct current-continuous power supply, and a radio-frequency start module including a radio-frequency power supply and a radio-frequency/direct-current control module coupled between the arcjet and the direct-current continuous power supply.

In one or more implementations, a method is provided that includes establishing a propellant flow between a cathode and an anode of an arcjet thruster; providing a radio-frequency electrical signal to the cathode and the anode until an arc is generated between the cathode and the anode within the propellant flow; providing a direct-current voltage difference between the cathode and the anode to maintain the arc; and terminating the radio-frequency voltage difference while the direct-current voltage difference maintains the arc.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
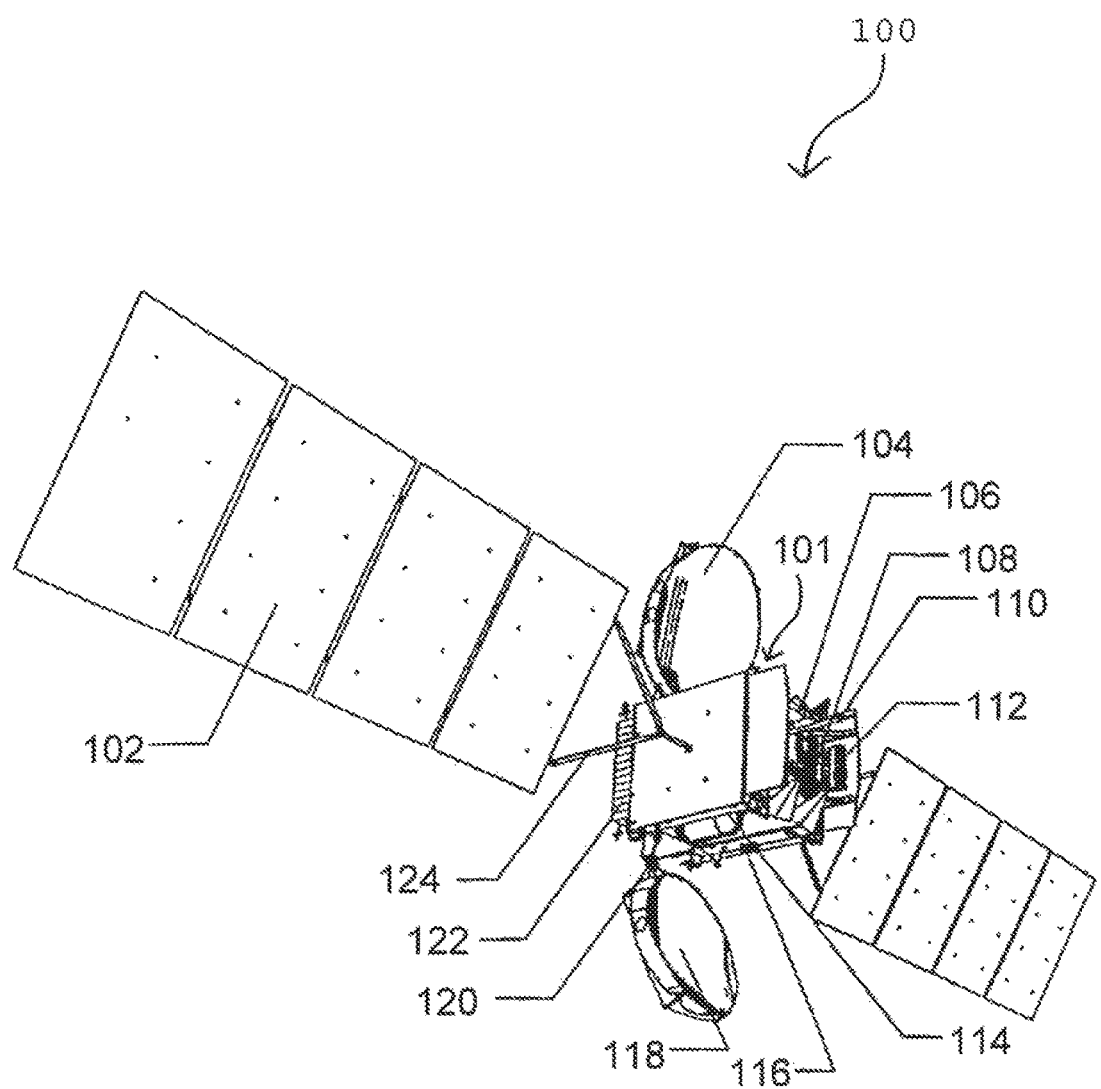
FIG. 1 illustrates a perspective view of an example of a spacecraft with an arcjet thruster having a radio-frequency start module and a direct-current power module.

FIG. 1 shows an example of a spacecraft. Spacecraft 100 may include a propulsion system having one or more arcjet thrusters 116 for attitude control and/or delta V for orbit acquisition, on-orbit activities, and de-orbit maneuvers. On-orbit activities can include but are not limited to station-keeping, rephasing, relocation, constellation maintenance, or momentum adjustment. Additional propulsion components (e.g., a bi-propellant liquid apogee engine for transfer orbit mode operations, etc.) may also be provided.

In one or more implementations, spacecraft 100 may include a spacecraft body 101, one or more solar arrays 102 mounted by a boom structure 124 to the exterior (e.g., an exterior surface) of the body, one or more antennae such as antenna 104 (e.g., a KU-band antenna) and antenna 118 (e.g., a C-Band antenna) mounted to the exterior of the body (e.g., directly mounted or mounted via a gimbal 120), a power storage module such as battery module 122, antenna circuitry such as antenna feed 106, Earth/Sun sensor 108, antenna output multiplexer 112, other antennae such as an omnidirectional antenna 110, and one or more propulsion components such as arcjet thruster 116 and oxidizer tank 114. Although spacecraft 100 is described herein as an exemplary spacecraft on which one or more arcjet thrusters such as arcjet thrusters 116 may be employed, it should be understood that spacecraft 100 and the components and subsystems described in connection therewith are merely illustrative and arcjet thrusters as described herein may be implemented to provide thrust for operations such as attitude control, orbit acquisition, on-orbit activitives, and/or de-orbit maneuvers for any suitable spacecraft.

Figure 2:
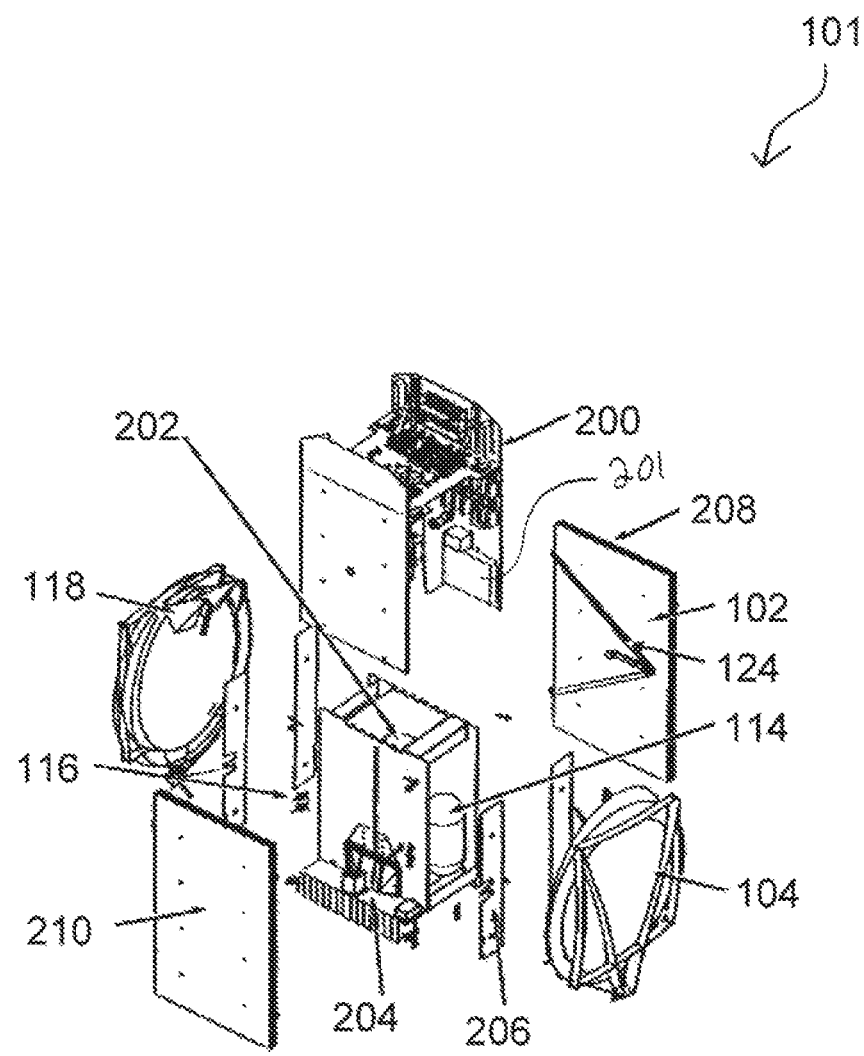
FIG. 2 illustrates an exploded perspective view of an example of a spacecraft with an arcjet thruster having a radio-frequency start module and a direct-current power module.

FIG. 2 shows an exploded perspective view of an example of the spacecraft body 101 in an undeployed configuration. As shown, body 101 may include a bus module 204 and a payload module 200. Propellant tanks such as a fuel tank 202 and one or more oxidizer tanks 114, along with other propulsion equipment such as arcjet thrusters 116 may be attached directly to bus module 204 in some implementations. Payload module 200 may consist of one or more flat panels such as a north, a south, and an Earthfacing transponder panel. These panels may be fastened together in an "H" shaped configuration as shown and mounted to the bus module 204. For ease of access, four east/west panels 206 may be installed after the bus and payload modules have been joined. Batteries may be mounted externally to the base of the bus module 204 for ease of removal and thermal isolation. Solar wings 102 (e.g., solar array 4-packs 208 and 210) and antenna reflectors 104 and 118 may be mounted on the north/south and east/west faces, respectively.

In the example of FIG. 2, a power regulation unit (PRU) 201 is mounted to the payload module 200 and may provide control and delivery of power from a power generator for the spacecraft (e.g., solar panels 102, a radioisotope thermoelectric generator (RTG), and/or other power generating circuitry) and/or one or more battery modules to other systems such as the antennae and arcjet thrusters 116. For example, PRU 201 may provide power to a power module that controls operations of the arcjet thrusters to maintain and/or otherwise adjust the orbit of the spacecraft autonomously or responsive to commands received from a control station (e.g., on Earth). PRU 201 may include the power module for the arcjet thrusters or may be coupled to one or more separate power supply modules for the arcjet thrusters (e.g., one or more separate power supply modules disposed in the payload module 200 or the bus module 204).

The composite box structure shown in FIGS. 1 and 2 may be easier to manufacture and provide the same strength and stiffness as other spacecraft implementations such as center cylinder design, and with less mass. However, the implementation of spacecraft 100 of FIGS. 1 and 2 is merely illustrative and arcjet thrusters and associated power supply modules and operations described herein may be implemented to provide long life propulsion for any suitable spacecraft (e.g., sub-orbital spacecraft, orbital spacecraft, and/or interplanetary or other spacecraft).

Figure 3:
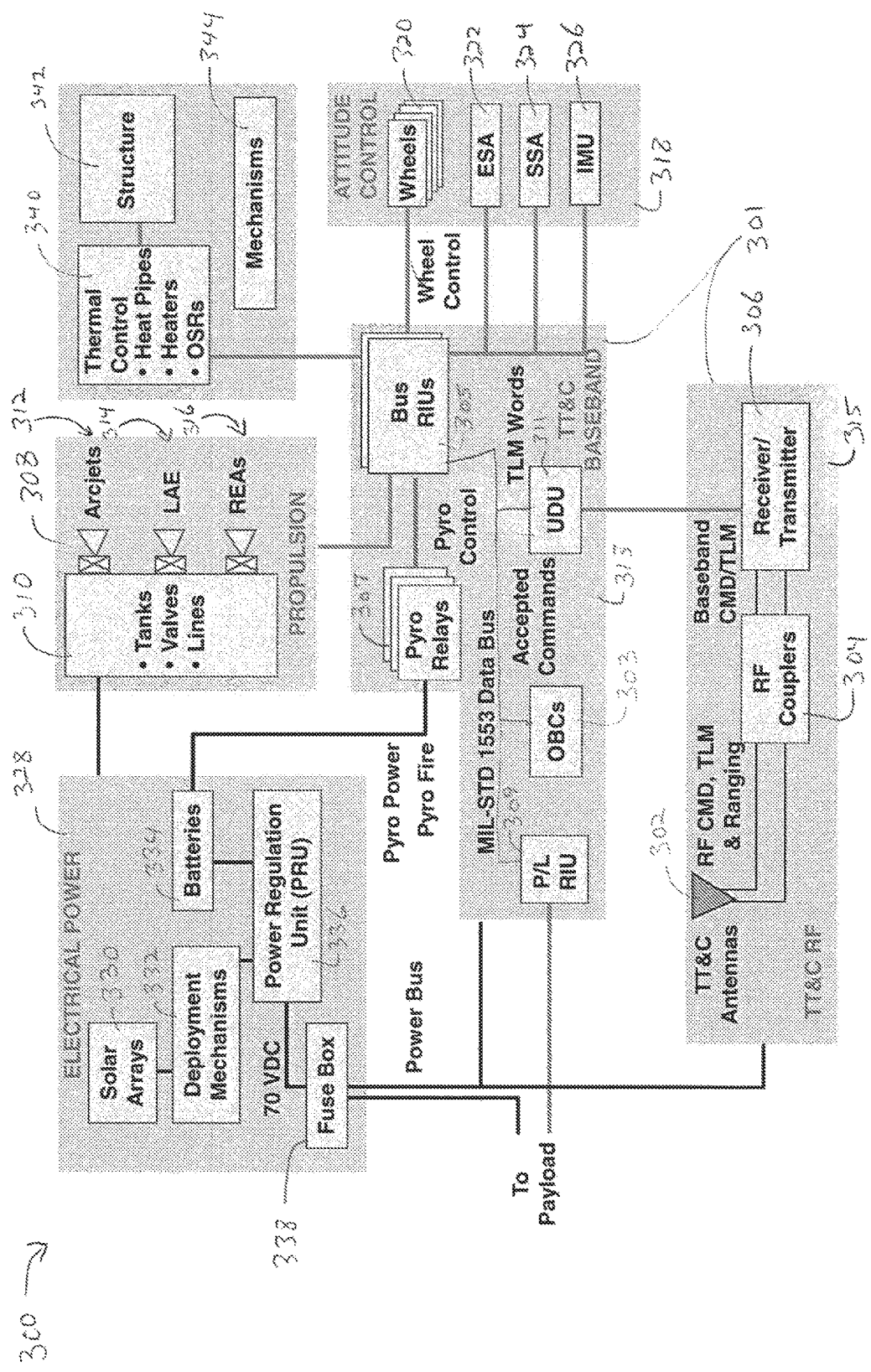
FIG. 3 illustrates a block diagram of an example of a spacecraft bus.

FIG. 3 is a schematic diagram of an exemplary spacecraft bus 300 (e.g., an implementation of bus 204 of FIG. 2). As shown in FIG. 3, spacecraft bus 300 may include various subsystems such as telemetry, tracking and command (TT&C) subsystem 301, propulsion subsystem 308, attitude control subsystem (ACS) 318, electrical power subsystem (EPS) 328, thermal control subsystem (TCS) 340, and structure and mechanisms subsystems 342 and 344.

In the example of FIG. 3, TT&C subsystem 301 incorporates one or more onboard computers (OBCs) 303, a data bus 313 such as an MIL-STD-1553B data bus and bi-directional data buses for command and control of each component on the spacecraft. As shown, TT&C subsystem 301 may also include one or more uplink/downlink units (UDUs) 311, one or more remote interface units (RIUs) such as Bus RIU 305 and P/L RIU 309 and one or more gyro relays 307 that form a TF&C baseband unit.

As shown in FIG. 3, TUC subsystem 301 may also include a TUC radio frequency (RF) unit 315 including a receiver/transmitter 306, one or more RF couplers 304 and one or more TT&C antennas 302.

Propulsion subsystem 308 may include a bi-propellant liquid apogee engine (LAE) 314 (e.g., for transfer orbit mode) and mono-propellant attitude control and station-keeping engines for on-orbit control. In this way, high-thrust, bi-propellant engines may be provided for perigee raising; and relatively more precise, lower thrust, and cleaner exhaust mono-propellant thrusters may also be provided. Arcjets 312 provide an efficient use of propellant to give long maneuver lifetimes with less propellant than standard mono-propellant and bi-propellant propulsion systems and less risk than other electric propulsion systems. As shown in FIG. 3, one or more rocket engine assemblies (REAs) 316 may be provided such as one or more mono-propellant thrusters for attitude control during LAE firings and one or more monopropellant thrusters for transfer orbit and on-station attitude control and east/west stationkeeping.

Mono-propellant thrusters such as one or more mono-propellant arcjets 312 as described herein may be provided. Arcjet thrusters 312 may be provided with one or more power supplies configured to start and maintain an arc for powered arcjet operations. As described in further detail hereinafter, the one or more power supplies of the arcjet thrusters may include an RF start power supply and a continuous direct-current (DC) power supply coupled to an arcjet via an RF/DC control module. One, two, three, four, or more than four arcjets 312 may be provided for a particular spacecraft. Each arcjet may include a corresponding power supply module or, in some implementations, a common power supply module may be provided to power and control more than one arcjet.

As shown in FIG. 3, ACS 318 may include one or more reaction wheel assemblies (RWAs) 320, one or more earth sensor assemblies (ESAs) 322, one or more sun sensor assemblies (SSAs) 324, and a continuously operating inertial measurement unit (IMU) 326.

Attitude determination processing may be performed remotely or on-board. On-board systems may be relatively more accurate and more flexible in that attitude determination can be done almost anywhere in the orbit and attitude changes can be commanded following attitude determination without adversely affecting pointing accuracy.

Electrical Power Subsystem (EPS) 328 may include one or more solar arrays 330, deployment mechanisms 332, batteries 334, a power regulation unit (PRU) 336, and fuse box 338. EPS 328 may operate on a regulated ±70 volt distributed BUS. Batteries 334 may include, in one embodiment, multiple battery subassemblies. Solar arrays 330 may include, in one embodiment, two 4-panel solar array wings such as solar arrays 208 and 210 of FIG. 2.

Thermal control system 340 may include one or more earth deck heat pipes that couple north and south radiator panels, providing a conductive heat path to the anti-sun side of the satellite, one or more heaters, and one or more optical solar reflectors (OSRs). Dissipating components may be mounted on heat pipe panels that reject heat via the north and south radiator panels, thus maintaining low diurnal temperature swings.

Structure subsystem 342 and mechanisms subsystem 344 may include an efficient, lightweight structure that satisfies all strength and stiffness requirements to mechanically support the spacecraft subsystems and interface to the launch vehicle. As described above in connection with FIGS. 1 and 2, the spacecraft structure may be composed of payload and core or bus modules. The payload module may be arranged to support payload needs, whereas the core may include the propulsion subsystem 308.

The spacecraft subsystems described above in connection, for example, with FIG. 3 are merely illustrative. It should be understood that one or more of the subsystems described may be omitted and/or other subsystems may be included without departing from the spirit and scope of the subject technology.

In the example of FIGS. 1, 2, and 3, the spacecraft 100 employs a dual-mode integral propulsion system. According to various embodiments, an electrically redundant, bipropellant liquid apogee engine (LAE) 310 provides the impulse necessary to take the satellite from launch vehicle separation to its final orbit. Six larger monopropellant thrusters may provide attitude control during LAE firings. Twelve smaller monopropellant thrusters may provide transfer orbit and on-station attitude control and east/west stationkeeping. One or more (e.g., four) ultra-high efficiency, long life monopropellant arcjets 312 (e.g., implementations of arcjets 116 as described herein) may be used for north/south stationkeeping. All attitude control and stationkeeping thrusters may employ full functional redundancy.

Propellants may be stored in a three-tank system in which pressurant is stored in one or two additional tanks. Fuel (e.g., hydrazine) may be stored in a cylindrical titanium tank 202 mounted in the center core of the spacecraft. Oxidizer (e.g., nitrogen tetroxide) may be stored in two cylindrical titanium tanks 114 mounted on either side of the hydrazine tank 202 in the east and west directions. Pressurant (e.g., helium) may be stored in a cylindrical titanium, graphite overwrapped tank located at the base of the satellite (not shown).

A dual-mode propulsion system of this type may provide the best of both bipropellant and monopropellant propulsion system operation. For example, the use of a bipropellant LAE allows the spacecraft to benefit from the high Isp/high thrust capabilities of bipropellant design, the use of monopropellant attitude control and stationkeeping thrusters allows the spacecraft to exploit the low thrust/low impulse-bit capabilities of monopropellant designs, the very high Isp of arcjets, and the clean exhaust nature of hydrazine. Arcjet power supply systems and methods described herein may provide improved control and longer lived stationkeeping functionality. More particularly, arcjet power supply systems and methods described herein may provide the capability of a greater number of starts per thruster and/or more throughput with lower starts (e.g., more total impulse).

Figure 4:
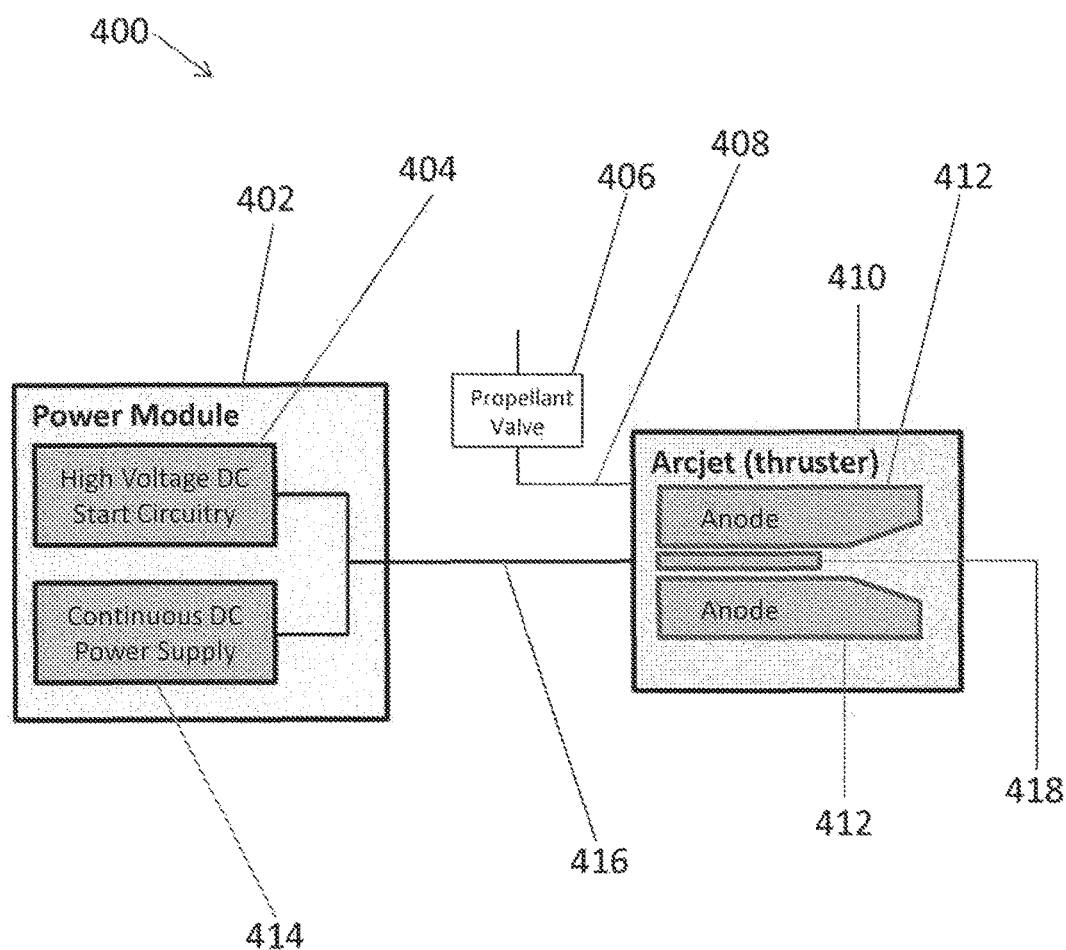
FIG. 4 illustrates a block diagram of an example of an arcjet thruster and an associated direct-current start and sustained power module.

FIG. 4 shows an exemplary implementation of an arcjet thruster and power module for providing power thereto. As shown in FIG. 4, arcjet thruster 410 may include anode structures 412 spaced apart from a cathode structure 418. For example, anode structures 412 may be formed from a substantially cylindrical anode having a central bore within which the cathode 418 is disposed.

Propellant valve 406 may be operated to provide propellant flow through the arcjet thruster between the anode 412 and the cathode 418. For example, propellant valve 406 may control gas flow through propellant feed tube 408. Propellant feed tube 408 may deliver gas to that space between anode 412 and cathode 418. Propellant feed tube 408 may include a catalyst bed that converts liquid propellant (e.g., N2H4) to a gas along the path to the electrodes 412 and 418. The propellant valve may be upstream or downstream of the catalyst bed.

Power module 402 may generate a voltage difference between anode 412 and cathode 418 sufficient that an electrical discharge in the form of an arc is formed across the gap between anode 412 and cathode 418 while the propellant gas flows therethrough. The propellant flow may provide thrust to the spacecraft that is enhanced by the energy provided by the arc as would be understood by one skilled in the art.

As shown, power module 402 may include startup circuitry such as high voltage DC start circuitry 404 to provide a sufficient voltage difference to cause the electrical discharge that creates the arc between the cathode and anode. The arc may be generated by a Paschen breakdown of the gas between the cathode and anode. Power module 402 may also include a relatively lower voltage power supply such as continuous DC power supply 414 for maintaining the arc once established. High voltage DC start circuitry may generate, via power feed cable 416, a voltage difference between cathode 418 and anode 412 of, for example, greater than 2000 V to cause the Paschen breakdown of the intervening gas, thus starting the arc. Continuous DC power supply 414 may provide, via power feed cable 416, a relatively lower voltage difference between cathode 418 and anode 412 of, for example, less than 150 volts (V). However, this is merely illustrative. In implementations in which a propellant other than hydrazine is used, continuous DC power supply 414 may provide a voltage difference of greater than 150 V, such as a voltage difference of less than 200V. Power feed cable 416 may be provided for electrically coupling high voltage DC start circuitry 404 and continuous DC power supply 414 to cathode 418 and anode 412. Power feed cable 416 may, for example, be a coaxial cable coupled to cathode 418 and anode 412.

Operating an arcjet system such as arcjet system 400 that includes high voltage DC start circuitry 404 and a relatively lower voltage continuous DC power supply 414 may include (i) initiating and stabilizing propellant flow through thruster 410, (ii) generating a high voltage DC pulse with high voltage DC start circuitry 404, (iii) after the arc is initiated (e.g., when a current flow is detected between cathode 418 and anode 412) turning off high voltage DC start circuitry 404; sustaining the arc by providing a continuous low DC voltage difference by DC power supply 414; and (iv) causing shutdown of continuous DC power supply 414 and closing valve 406 to turn off thruster system 400 (e.g., when a desired burn duration has elapsed). The desired burn duration may be determined automatically at the spacecraft or may be provided to the spacecraft via a remote source (e.g., a groundstation command to the spacecraft). In other embodiments, the arc may be initiated via inductor "flyback".

Figure 5:
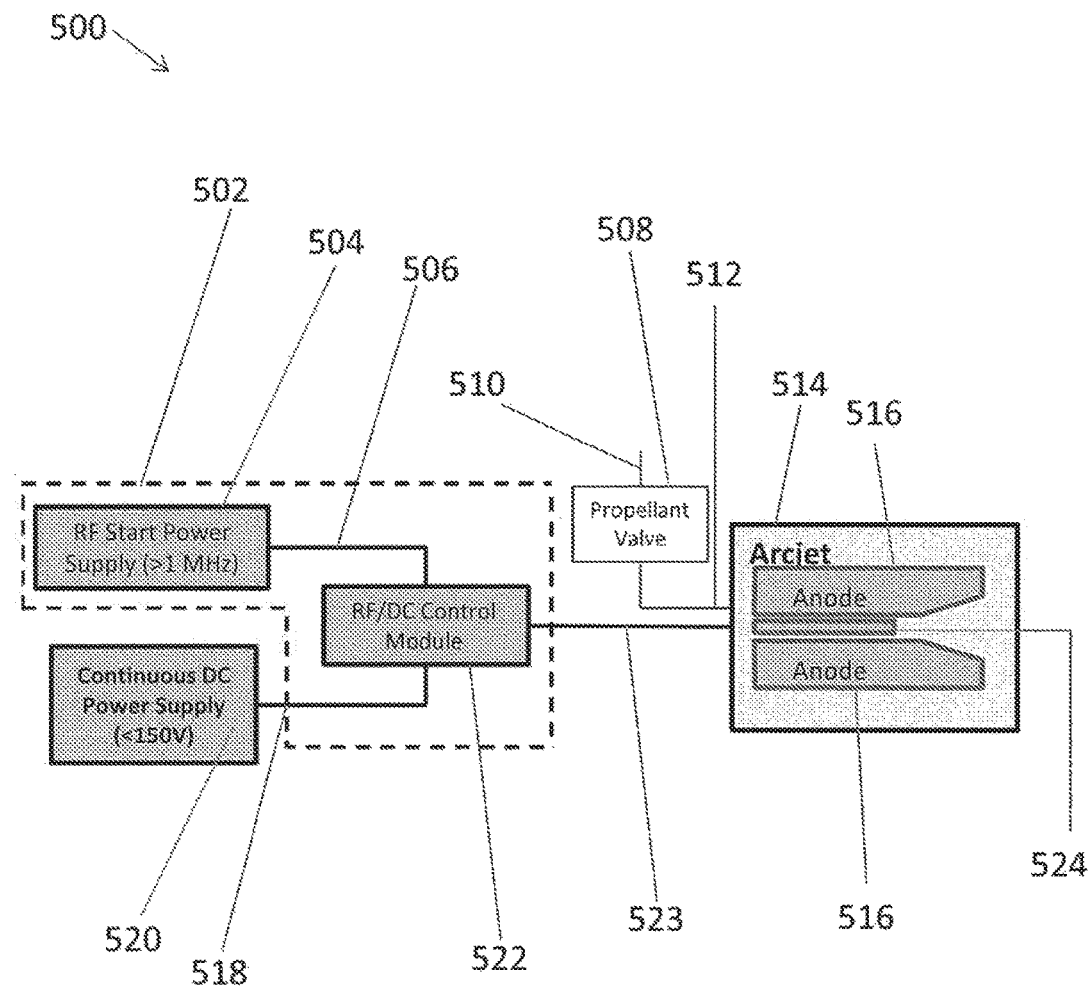
FIG. 5 illustrates a block diagram of an example of an arcjet thruster, an associated radio-frequency start module, and a sustaining direct-current power module.
Figure 6:
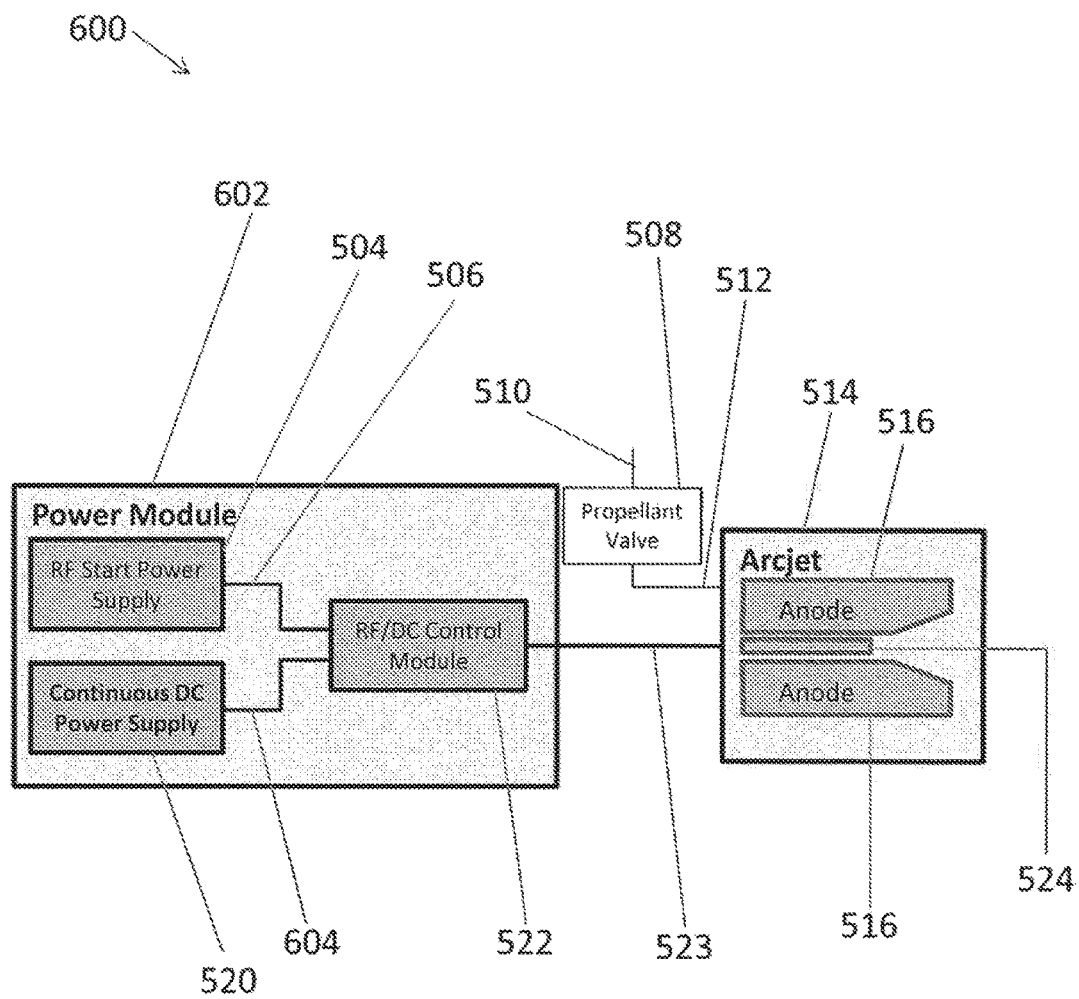
FIG. 6 illustrates a block diagram of an example of an arcjet thruster and a radio-frequency start and sustaining direct-current power module.
Figure 7:
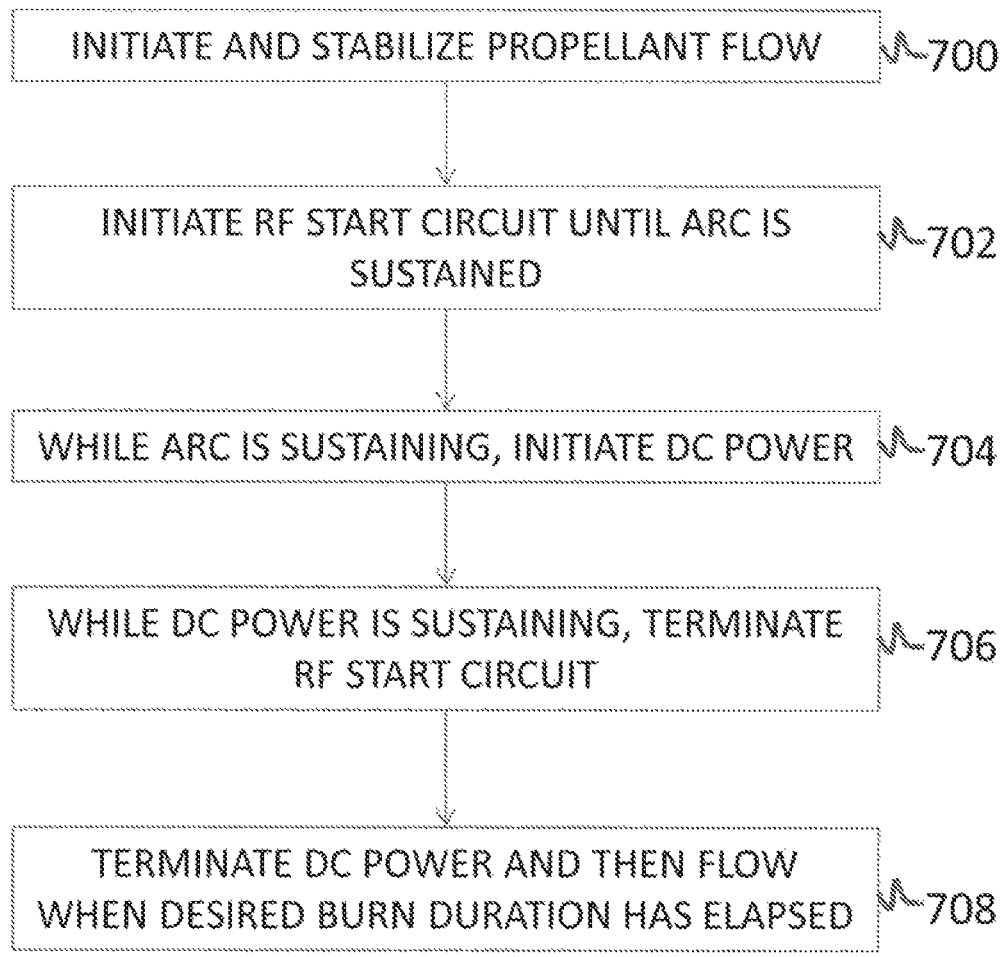
FIG. 7 illustrates a flowchart of exemplary operations that may be performed for starting and operating an arcjet thruster.
Figure 8:
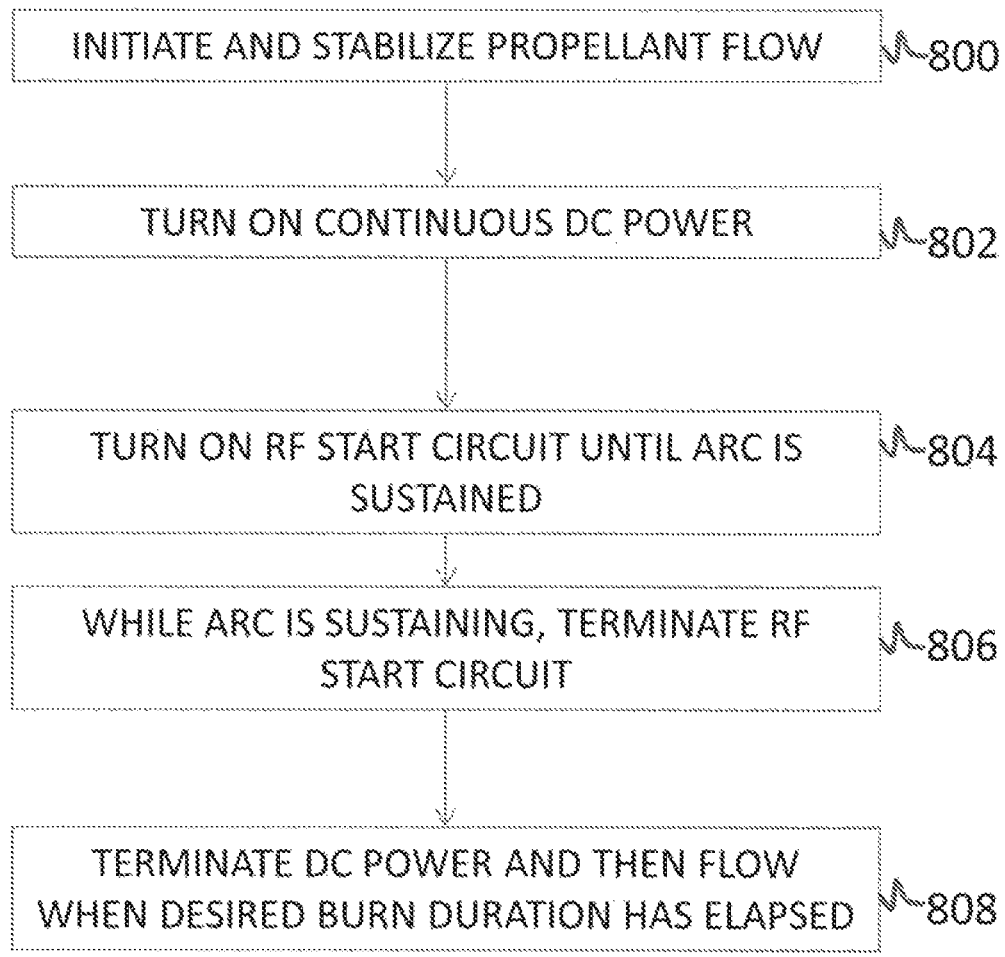
FIG. 8 illustrates a flowchart of exemplary operations that may be performed for starting and operating an arcjet thruster.

Although the thruster system 400 of FIG. 4 can be used to provide arcjet thrust, the high voltage DC start circuitry 404, over many uses, may cause undesirable wear on one or more of the arcjet electrodes the anode and/or the cathode). FIGS. 5 and 6 show other embodiments of power supply systems for arcjet thrusters that may provide significantly less wear on the arcjet components and thereby increase the accuracy and lifetime of the thrusters. FIGS. 7 and 8 show illustrative operations that may be performed for providing propulsion using the arcjet systems of FIGS. 5 and/or 6.

As shown in FIG. 5, an arcjet thruster system 500 may be provided with a radio-frequency (RF) start power supply for initiating an arc between a cathode and an anode of an arcjet. In the example of FIG. 5, arcjet thruster 514 may include anode structures 516 spaced apart from a cathode structure 524. For example, anode structures 516 may be formed from a substantially cylindrical anode having a central bore within which the cathode 524 is disposed.

Feed line 510 may provide a supply of propellant gas (e.g., $N_2H_4$ from, for example, fuel tank 202 of FIG. 2) to a valve such as propellant valve 508. Propellant valve 508 may be operated to provide propellant gas flow through the arcjet thruster 514 between the anode 516 and the cathode 524. For example, propellant valve 508 may control gas flow through propellant feed tube 512. Propellant feed tube 512 may deliver gas to the space between anode 516 and cathode 524. Propellant feed tube 512 may include a catalyst bed that converts liquid propellant to a gas along the path between valve 508 and electrodes 516 and 524.

As shown in FIG. 5, arcjet thruster system 500 may include an RF/DC control module 522 electrically coupled between an RF start power supply 504 and a power feed line 523 (e.g., a coaxial power supply feed line) electrically coupled to electrodes 516 and 524 of arcjet 514. RF/DC control module 522 may also be electrically coupled between continuous DC power supply 520 and power feed line 523. RF/DC control module 522 may, for example, be a switch that seamlessly switches feedline 523 from a connection to RF start power supply 504 to a connection to direct-current (DC) power supply 520.

RF start power supply 504, when coupled to feed line 523 by control module 522 may generate an oscillating, radio-frequency electrical signal that is transmitted, via power feed line 523 to the space between anode 516 and cathode 524. The RF start power supply 504 may provide a signal that oscillates with a frequency in the radio frequency range such as a frequency of greater than 1 MHz. The RF signal supplied by RF start power supply 504 may cause ionization between cathode 524 and anode 516 within the propellant gas as it flows therethrough. An arc is then maintained using the continuous direct-current power supply 520 even though the voltage difference across the electrodes at any given time is substantially less that that provided by a high voltage DC power supply. In this way, the propellant flow may provide thrust to the spacecraft that is enhanced by the energy provided by an arc that is generated with a significantly reduced start voltage, thereby reducing the stress (and eventual wear) of the electrodes. The RF signal power provided by RF start power supply 504 may be, for example, between 0 W and 300 W. The maximum voltage difference supplied by continuous direct-current power supply 520 may, for example, be 150 V.

As shown in FIG. 5, RF/DC control module 522 may receive inputs from both RF start power supply 504 and continuous DC power supply 520 and may operate to selectively provide an output to feed line 523 from RF start power supply 504 and/or continuous DC power supply 520. In one implementation, both the RF start power supply 504 and the RF/DC control module 522 may optionally be contained in the RF Start Module 502. Two operational sequence examples of selectively providing output to feed line 523 from RF start power supply 504 and/or continuous DC power supply 520 are described in further detail hereinafter in connection with FIGS. 7 and 8.

DC power supply 520 may be provided for maintaining the arc initiated by RF start power supply 504. Continuous DC power supply 520 may provide, via power feed cable 523, a voltage difference between cathode 524 and anode 516 of, for example, less than 200 V. RF start power supply 504, continuous DC power supply 520, and RF/DC control module 522 may be disposed within a housing body of a spacecraft and may be coupled to arcjet 514 disposed within an opening in the outer housing or on an external mount of the housing such that the arcjet can expel propellant to provide thrust. For example, the arcjet may be mounted in an opening in the spacecraft body, the power module may be disposed within the spacecraft body, and the spacecraft may include at least one antenna mounted to the exterior of the body. In one embodiment, RF/DC control module 522 is configured to provide a radio-frequency signal from RF start power supply 504 to the arcjet 514 via a coaxial feedline 523 coupled between the radio-frequency/direct current control module 522 and the cathode 524 and the anode 516 of the arcjet 514 to initiate an electrical discharge arc between the anode and the cathode. In one embodiment, the RF/DC control module 522 is further configured to provide a direct-current voltage difference from the DC continuous power supply 520, via the coaxial feedline 523, to the cathode 524 and the anode 516 of the arcjet 514 to sustain the electrical discharge arc. The RF/DC control module may provide the direct-current voltage difference before or after the radio frequency signal is provided.

In the example of FIG. 5, dashed line 502 shows an optional housing within which RF start power supply 504 and RF/DC control module 522 can be co-located with an electrical coupling 506 therebetween to form an RF start module. In this implementation, housing 502 may include a connector 518 for coupling continuous DC power supply 520, located external to housing 502, to RF/DC control module 522 disposed within housing 506. RF start power supply 504, continuous DC power supply 520, and RF/DC control module 522 may be attached to a bus or core module of the spacecraft in some implementations. However, this is merely illustrative. In other implementations, RF start power supply 504 and RF/DC control module 522 may be separate modules with separate housings, continuous DC power supply 520 and RF/DC control module 522 may be formed in a common housing that is separate from the housing of RF start power supply 504, RF start power supply 504 and continuous DC power supply 520 may be disposed in one common housing that is separate from RF/DC control module 522, or RF start power supply 502, continuous DC power supply 520, and RF/DC control module 22 may all be formed within a common housing (as in the example of FIG. 6 below).

FIG. 6 illustrates a schematic diagram of another example of an arcjet thruster system. The description from FIG. 5 generally applies to FIG. 6, with examples of differences between FIG. 5 and FIG. 6 and other description provided herein for purposes of clarity and simplicity.

In FIG. 6, RF start power supply 504, continuous DC power supply 520, and RF/DC control module 522 are disposed within a common module housing 602. As shown, cabling 506 coupled between RF start power supply 504 and RF/DC control module 522 is disposed within housing 602 and cabling 604, coupled between continuous DC power supply 520 and RF/DC control module 522, is also disposed within housing 602.

Housing 602 may include one or more connectors (not shown) for coupling to spacecraft electrical power and/or control systems and may be attached to the core or bus module of a spacecraft. The implementation of FIG. 6 may provide a simplified system in which a modular power supply 602, including all of the RF start and DC control power for the arcjet can be provided. In this way, spacecraft assembly and design can be made more efficient. Arcjet system 500 of FIG. 5 or arcjet system 600 of FIG. 6 may be implemented as an arcjet thruster for a spacecraft (e.g., may be an implementation of arcjet 116 of FIGS. 1 and 2 and/or arcjets 312 of FIG. 3).

Although the examples of FIGS. 5 and 6 show arcjet systems (e.g., arcjet systems 500 and 600) each having a single RF start power supply 504, a single DC power supply 520, and a single RF/DC control module 522, this is merely illustrative. In various implementations, an arcjet system may be provided with two or more RF start power supplies, two or more DC power supplies, and/or two or more RF/DC control modules to provide redundant functionality for each. In one exemplary implementation, redundant circuitry for an arcjet system may be provided, for example, by providing a RF start power supply box with two or more redundant RF start power supplies therein, a DC power supply box with two or more redundant DC power supplies therein, and a RF/DC, control box with two or more redundant RF/DC control modules disposed therein.

RF start power supply 504 and DC power supply 520 may be coupled to a common spacecraft power bus for receiving electrical power from the spacecraft. RF start power supply 504, DC power supply 520, and RF/DC control module 522 of each of one or more arcjet thruster systems may receive control signals from a master control circuit coupled to spacecraft control circuitry by, for example, a serial interface bus. In some implementations, each arcjet thruster may be coupled to a corresponding RF start power supply 504, DC power supply 520, and RF/DC control module 522. In other implementations, an output select circuit may be coupled between one or more power modules (each having a RF start power supply 504, DC power supply 520, and RF/DC control module 522) and the power feed lines of one or more arcjet thrusters so that a particular power module can be selected to provide power to one or more of the arcjet thrusters.

FIGS. 7 and 8 illustrate flow charts of example methods of operating an arcjet thruster.

For explanatory and illustration purposes, the example operations of FIGS. 7 and 8 may be each performed by either of the systems 500 or 600 of FIGS. 5 and 6 and their components such as RF start power supply 504, continuous DC power supply 520, RF/DC control module 522, and anode 516 and cathode 524 of arcjet 514. However, the example processes of FIGS. 7 and 8 are not limited to the systems of FIG. 5 or 6 or their components, and the example processes of FIGS. 7 and 8 may be performed by some of the devices shown in FIGS. 5 and/or 6, or other devices or components.

In the example of FIG. 7, at block 700, propellant flow may be initiated and stabilized (e.g., through the gap between the anode and the cathode of an arcjet thruster).

At block 702, an RF start circuit may be initiated until an arc is sustained between the anode and the cathode. Initiating the RF start circuit may include selecting the RF start power supply (RF start circuit) with an RF/DC control module, generating an RF signal with the RF start circuit, and transmitting the RF signal from the RF start circuit along a power feed line into the gap within which the propellant flows. The RF signal may be a radio signal with a frequency of, for example, at least one megahertz (MHz) (e.g., in implementations in which hydrazine is used as a propellant). However, this is merely illustrative. In implementations in which a propellant other than hydrazine is used, the RF signal frequency may be greater than 1 kHz.

At block 704, while the arc is sustaining, DC power may be initiated. Initiating DC power may include providing, from a continuous DC power supply, via the RF/DC control module and the same (or different) power feed line, a voltage difference (e.g., a voltage difference of less than 150 V) to the cathode and the anode of the arcjet thruster.

At block 706, while the DC power is sustaining (e.g., the arc between the anode and the cathode of the arcjet thruster is sustained by the DC power), the RF start circuitry operation may be terminated.

At block 708, DC power and then the propellant flow may also be terminated when a desired burn duration has elapsed. The desired burn duration maybe determined onboard (e.g., automatically for a stationkeeping maneuver) or may be received from a remote source such as a groundstation.

In the example of FIG. 8, at block 800, propellant flow may be initiated and stabilized (e.g., through the gap between the anode and the cathode of an arcjet thruster).

At block 802, DC power may be turned on. Turning on DC power may include providing, from a continuous DC power supply, via an RF/DC control module and a power feed line, a voltage difference (e.g., a voltage difference of less than 150 V) to the cathode and the anode of an arcjet thruster.

At block 804, while the DC power is being provided, an RF start circuit may be turned on until an arc is sustained between the anode and the cathode. Turning on the RF start circuit may include selecting the RF start power supply (RF start circuit) with the RF/DC control module, generating an RF signal (e.g., a radio signal with a frequency of at least one megahertz (MHz)) with the RF start circuit, and transmitting the RF signal from the RF start circuit along the same (or different) power feed line into the gap within which the propellant flows.

At block 806, while the arc is sustaining (e.g., the arc between the anode and the cathode of the arcjet thruster is sustained by the DC power), the RF start circuitry operation may be terminated.

At block 808, DC power and then the propellant flow may also be terminated when a desired burn duration has elapsed. The desired burn duration maybe determined onboard (e.g., automatically for a stationkeeping maneuver) or may be received from a remote source such as a ground station.

Like reference numerals may designate like elements. For example, same reference numerals 102, 104, 114, 116, 118, 124, 504, 506, 508, 510, 512, 514, 516, 520, 522, and 524 are used in various figures for simplicity and convenience. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

It is understood that the specific order or hierarchy of steps and/or operations in the processes disclosed is an illustration of exemplifying approaches. Based upon design preferences, it is understood that the specific order or hierarchy of steps in the processes may be rearranged and/or omitted. Some of the steps may be performed simultaneously.

It is noted that dimensional aspects (e.g., height, width) provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect.

Terms such as top, bottom, front, rear, side, horizontal, vertical, and the like refer to an arbitrary frame of reference, rather than to the ordinary gravitational frame of reference.

Thus, such a term may extend upwardly, downwardly, diagonally, or horizontally in a gravitational frame of reference.

The phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" means "serving as an example or illustration." Any aspect or design described herein as "exemplary" is not necessarily to be construed as preferred or advantageous over other aspects or designs. A reference to an element in the singular is not intended to mean "one and only one" unless specifically stated, but rather "one or more." The term "some" refers to one or more. The term "example" is sometimes used a noun and sometimes used as an adjective.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. An arcjet thruster for a spacecraft, the arcjet thruster comprising:
   an arcjet having:
      an anode,
      a cathode, and
      a propellant valve configured to direct a propellant between the cathode and the anode; and
   a power module comprising:
      a radio-frequency start power supply,
      a direct-current continuous power supply, and
      a radio-frequency/direct-current control module coupled to the arcjet, the radio-frequency start power supply, and the direct-current continuous power supply,
   wherein the radio-frequency/direct-current control module is (i) switchably coupled, at an input end, to the radio-frequency start power supply and the direct-current continuous power supply, (ii) coupled, at an output end, to a coaxial feedline for the arcjet, and (iii) is configured to provide a radio-frequency signal from the radio-frequency start power supply, via the coaxial feedline, to the cathode and the anode of the arcjet to initiate an electrical discharge arc between the anode and the cathode,
   wherein the radio-frequency/direct-current control module is further configured to provide a direct-current voltage difference from the direct-current continuous power supply, via the coaxial feedline, to the cathode and the anode of the arcjet to sustain the electrical discharge arc, and
   wherein the radio-frequency/direct-current control module is programmed with instructions to provide the direct-current voltage difference before the radio-frequency signal.

2. The arcjet thruster of claim 1, wherein the radio-frequency/direct-current control module is configured to provide the direct-current voltage difference after the radio-frequency signal.

3. The arcjet thruster of claim 1, wherein the direct-current voltage difference is less than 150 volts.

4. The arcjet thruster of claim 1, wherein the radio-frequency signal has a frequency of at least one kilohertz.

5. A spacecraft, comprising:
   a propulsion system that includes:
      an arcjet having:
         an anode,
         a cathode, and
         a propellant valve configured to direct a propellant between the cathode and the anode; and
      a power module comprising:
         a radio-frequency start power supply,
         a direct-current continuous power supply, and
         a radio-frequency/direct-current control module interposed between the arcjet and both of the radio-frequency start power supply and the direct-current continuous power supply,
   wherein the radio-frequency/direct-current control module is configured to provide a radio-frequency signal from the radio-frequency start power supply to the arcjet via a coaxial feedline coupled to the radio-frequency/direct-current control module, the cathode, and the anode of the arcjet to initiate an electrical discharge arc between the anode and the cathode,
   wherein the radio-frequency/direct-current control module is further configured to provide a direct-current voltage difference from the direct-current continuous power supply, via the coaxial feedline, to the cathode and the anode of the arcjet to sustain the electrical discharge arc,
   wherein the radio-frequency/direct-current control module is programmed with instructions to provide the direct-current voltage difference before the radio-frequency signal.

6. The spacecraft of claim 5, wherein the propulsion system comprises a plurality of arcjets.

7. The spacecraft of claim 5, further comprising:
a body; and
at least one antenna mounted to an exterior surface of the body.

8. The spacecraft of claim 7, wherein the arcjet is mounted in an opening in the spacecraft body, wherein the power module is disposed within the spacecraft body.

9. The spacecraft of claim 8, further comprising a power generator for the spacecraft.

10. A method, comprising:
establishing a propellant flow between a cathode and an anode of an arcjet thruster;
providing a radio-frequency electrical signal to the cathode and the anode until an arc is generated between the cathode and the anode within the propellant flow;
providing a direct-current voltage difference between the cathode and the anode to maintain the arc; and
terminating the radio-frequency electrical signal while the direct-current voltage difference maintains the arc, wherein providing the direct-current voltage difference comprises providing the direct-current voltage difference before the arc is generated by the radio-frequency electrical signal.

11. The method of claim 10, wherein the direct-current voltage difference is less than 150 Volts.

12. The method of claim 11, wherein providing the radio-frequency electrical signal comprises providing the radio-frequency electrical signal at a frequency of at least one kilohertz.

13. The method of claim 10, wherein providing the radio-frequency electrical signal comprises providing the radio-frequency electrical signal at a frequency of at least one kilohertz.

* * * * *